United States Patent [19]

Grams et al.

[11] Patent Number: 4,628,503
[45] Date of Patent: Dec. 9, 1986

[54] METHOD AND DEVICE FOR PERFORMING A BUS REQUEST AND COLLECTIVE ACKNOWLEDGEMENT IN A PROCESS BUS SYSTEM

[75] Inventors: Timm Grams, Viernheim; Werner Deck, Ludwigshafen; Johannes Figge, Lorsch; Hartmut Siebert, Mannheim, all of Fed. Rep. of Germany

[73] Assignee: Brown, Boveri & Cie AG, Mannheim, Fed. Rep. of Germany

[21] Appl. No.: 578,670

[22] Filed: Feb. 9, 1984

[30] Foreign Application Priority Data

Feb. 9, 1983 [DE] Fed. Rep. of Germany ....... 3304300

[51] Int. Cl.$^4$ ............................................. H04J 3/00
[52] U.S. Cl. .................................... 370/85; 340/825.5
[58] Field of Search ................... 370/85, 94, 110.4; 340/825.5, 825.38, 825.54

[56] References Cited

U.S. PATENT DOCUMENTS

| 3,870,828 | 3/1975 | Saliga | 370/110.4 |
| 3,938,156 | 2/1976 | Lunden | 370/110.4 |
| 4,096,355 | 6/1978 | Rothauser et al. | 370/94 |
| 4,131,761 | 12/1978 | Giusto | 370/110.4 |
| 4,363,127 | 12/1982 | Evans et al. | 370/110.4 |
| 4,409,592 | 10/1983 | Hunt | 370/94 |

Primary Examiner—Douglas W. Olms
Attorney, Agent, or Firm—Herbert L. Lerner; Laurence A. Greenberg

[57] ABSTRACT

A method for performing a bus request or collective acknowledgement on a bus system, in a process bus system for serial data transmission, including subscribers of the process bus system, and a bus control device, includes generating a band-limited signal capable of superposition at all of the subscribers, in accordance with a common given principle, transmitting the band-limited signal with the subscribers for performing a bus request or collective acknowledgement, and analyzing the signal with the bus control device, and a device for carrying out the method.

7 Claims, 4 Drawing Figures

METHOD AND DEVICE FOR PERFORMING A BUS REQUEST AND COLLECTIVE ACKNOWLEDGEMENT IN A PROCESS BUS SYSTEM

The invention relates to a method for performing a bus request and collective acknowledgement in a process bus system for serial data transmission.

Process bus systems are used for process data communication in automatic control engineering, for example in control systems for guiding industrial processes. These process bus systems are digital systems incorporating byte-serial or bit-serial data transmission between several system users or subscribers. Since it is not permissible for several system users or subscribers to be transmitting data simultaneously in such data transmission systems, a control device provides bus allocation, such as in accordance with a cyclic method, wherein the bus is allocated to the system users or subscribers successively in accordance with a predetermined sequence. Frequently, it is also necessary to have a spontaneous bus request capability for event messages, in addition to a cyclic bus allocation. The cyclic operation can be interrupted and a cycle-independent bus allocation can be carried out on the basis of a spontaneous bus request. For economic reasons, as a rule only one bus can be made available for all system users or subscribers for the spontaneous bus request for event reporting. Nevertheless, an arbitrary number of system users or subscribers must be able to send a bus request signal, either simultaneously or with an arbitrary phase shift. Such a bus must therefore be conceived of as performing a logical OR operation.

Apart from performing the bus request for event reporting, sometimes a collective acknowledgement is also performed with the bus system. In the case of the collective acknowledgement, normally all system users or subscribers continuously deliver a signal. If a message (to be acknowledged by all system users or subscribers) is correctly received, the transmitter is switched off for a given time. The rest state on the line is interpreted (for example by the bus management program) as a positive acknowledgement. In the case of the collective acknowledgement, a logical AND operation occurs which is implemented in this case with the aid of a logical OR operation in accordance with the de Morgan rules.

In each case, several solutions exist for the event message or acknowledgement on bus systems. An abbreviated cyclic inquiry (or polling) is described on page 6 in Part 2 of DIN Draft 19241 of October 1982. In this arrangement, the system users or subscribers are provided with the possibility of performing a bus request in a special polling cycle, but the abbreviated cyclic polling reduces the data throughput, that is to say the volume of data which can be transmitted per unit time.

A time-division multiplex-based event polling function implemented in the Honeywell TDC 2000 System, is described on page 71 of the book "Digitale Prozessdaten-Kommunikationssysteme (Bus-Systeme)" (Digital process data communication systems (bus systems)), edited by K. Fleck, VDE -Publishers, 1980. In this arrangement, a polling operation is performed in a cycle of at least 10 ms, in which the system users or subscribers can successively respond and, if necessary, report a bus request within a predetermined time window. However, this method is restricted to a few system users only, because the polling would otherwise consume too much time. Instead of time-division multiplex operation, frequency-division multiplex operation is also possible, but it needs individual adjustment of the system user or subscriber transmitters. A logical OR operation with the aid of an open-collector line driver is also known from pages 67 to 69 of Part 1, of DIN IEC 625, May 1981. Use of this circuit is restricted to short bus lengths (for example within one cabinet or switchboard) and low transmission rates.

For the bus system of a process bus within a system range involving distances up to a few kilometers, a signal is needed which meets the following requirements:

(a) It must be free of direct current and capable of being coupled into a transmission line, for example inductively.

(b) The additive superimposition of a limited number of transmitting signals, which are arbitrarily displaced in time with respect to one another, must not lead to a total cancellation within the period under observation.

In order to facilitate multiple use of the transmission path in frequency-division multiplex, the following requirements must also be met:

(c) About 80% of the signal transmitting power should be concentrated in an arbitrarily predeterminable frequency band.

(d) The superposition of a limited number of transmitting signals must not lead to total cancellation of the transmitting power in this predetermined band.

(e) The signal should be formed by the same law of formation or principle in all of the transmitters without individual adjustment.

It is accordingly an object of the invention to provide a method and device for performing a bus request and collective acknowledgement in a process bus system, which overcomes the hereinaforementioned disadvantages of the heretofore-known methods and devices of this general type, and which enables a logical OR operation to be performed on a bus system of a process bus with the aid of a band-limited signal which is free of direct current and capable of superimposition in accordance with the preceding requirements.

With the foregoing and other objects in view there is provided, in accordance with the invention, a method for performing a bus request or collective acknowledgement on a bus or omnibus system, in a process bus system for serial data transmission, including subscribers of the process bus system, and a bus control device, which comprises generating a band-limited signal capable of superimposition at all of the subscribers in accordance with a common given principle, transmitting the band-limited signal with the subscribers for performing a bus request or collective acknowledgement, and analyzing the signal with the bus control device.

In accordance with another mode of the invention, there is provided a method which comprises forming the signal which is capable of superimposition in the form of an identical digital pseudo noise signal at all of the subscribers, by:

phase modulating a pulse sequence of square-wave oscillations by means of a digital signal formed of a pseudostochastic binary sequence;

selecting a number of pulses per period of the binary sequence which is substantially twice as high as the maximum number of subscribers connectible to the process bus system;

selecting the frequency of the square-wave oscillations in such a manner that the maximum of the power density spectrum of the pulse sequence substantially corresponds to the band center frequency $f_M$ of a predetermined frequency band having a band width B; and selecting a number k of the square-wave oscillations per pulse of the binary sequence in such a manner that 1/k substantially corresponds to a relative band width $B/f_M$.

In accordance with a further mode of the invention, there is provided a method in which the process bus system includes a diode and filters, which comprises forming the signal which is capable of superposition in the form of a noise signal generated by the diode operated in the blocking direction and limited by the filters.

In accordance with an added mode of the invention, there is provided a method in which the process bus system includes a common line, which comprises transmitting data and the signals for a bus request or collective acknowledgement on the common line in separate frequency bands.

In order to carry out the method, there is provided a device for performing a bus request or collective acknowledgement on a bus system in a process bus system for serial data transmission, comprising subscribers of the process bus system for transmitting a band-limited digital pseudo noise signal capable of superposition for performing a bus request or collective acknowledgement, a bus control device for analyzing the signal, and a noise transmitter for generating the digital pseudo noise signal at the subscribers, the noise transmitter including a square-wave oscillator having an output, a frequency divider having an input connected to the output of the square-wave oscillator and an output, a pseudo noise sequence generator containing a feedback shift register and having an input connected to the output of the frequency divider and an output, an exclusive OR gate having one input connected to the output of the square-wave generator, another input connected to the output of the pseudo noise sequence generator and an output, and a signal amplifier having an input connected to the output of the exclusive OR gate and an output delivering the digital pseudo noise signal.

In accordance with a concomitant feature of the invention, the digital pseudo noise signal produced by the noise transmitter is a pulse sequence formed of square-wave oscillations produced by the square-wave oscillator and phase modulated by a digital signal formed of a pseudostochastic binary sequence generated by the pseudo noise sequence generator, the number of pulses per period of the binary sequence is substantially twice as high as the maximum number of the subscribers connectible to the process bus system, the frequency of the square-wave oscillations is such that the maximum of the power density spectrum of the pulse sequence substantially corresponds to the band center frequency $f_M$ of a predetermined frequency band having a band width B, and the number k of the square-wave oscillations per pulse of the binary sequence is such that 1/k substantially corresponds to the relative band width $B/f_M$.

According to the objects of the invention, a signal which is free of direct current and is capable of superposition, is needed. The freedom of the signal from direct current is required to permit transmission without direct coupling. This condition is met by signals which are periodically free of direct current. A signal of a period T is considered to be free of direct current when the integral of the signal over the period T results in a value of zero.

The capability for superposition, which is also required, is not, however, met by all signals which are periodically free of direct current. Sine-wave oscillations and square-wave oscillations, for example, are not limitlessly capable of superposition since the superposition of two signals with the same amplitude which are shifted in phase with respect to one another by a half period, produces a zero signal, that is to say cancellation. In contrast, a sawtooth oscillation is theoretically limitlessly capable of superposition, but in practice, the capability for superposition is limited by the available band width. This is because the superposition of two sawtooth oscillations of equal magnitude which are displaced with respect to one another by a half period, produces a sawtooth oscillation of identical amplitude and twice the frequency. Correspondingly, the resultant frequency rises to M-times the frequency with M signals and all other conditions remaining the same.

However, in practical applications it is not necessary for the signal to have an unlimited capability for superposition. A capability for superposition which is limited to a certain number of signals, that is to say to the number of system users or subscribers having access to a process bus system, is sufficient. Such signals with limited capability of superposition can be generated relatively simply by means of a digital circuit, and can be limited to a relatively small band width.

The illustrated embodiment relates to a method and a device for transmitting data and signals for a bus request or collective acknowledgement on a common line in separate frequency bands. However, the known method of transmitting data is not described in further detail in the text which follows. Instead, only the generation and transmission of the band-limited signal which is capable of superposition, for a bus request and collective acknowledgement according to the invention, will be described.

Other features which are considered as characteristic for the invention are set forth in the appended claims.

Although the invention is illustrated and described herein as embodied in a method and device for performing a bus request and collective acknowledgement in a process bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
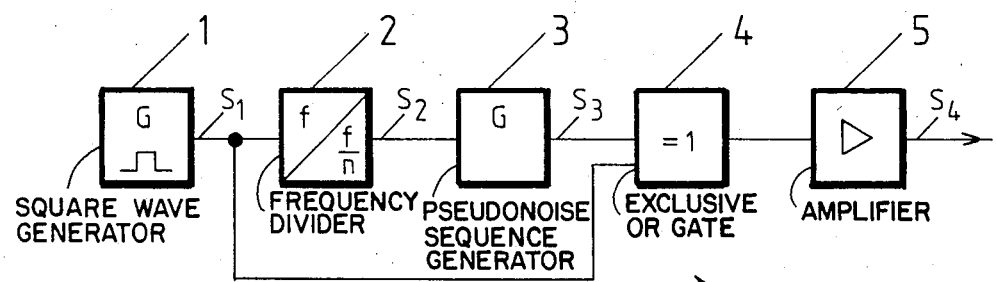
FIG. 1 is a block circuit diagram of a digital noise transmitter.

Referring now to the figures of the drawing in detail and first particularly to FIG. 1 thereof, there is seen a block diagram of a digital noise transmitter 6. The noise transmitter 6 includes a square-wave generator 1, a frequency divider 2, a pseudo noise sequence generator 3, an exclusive OR gate 4 and a signal amplifier 5. The output of the square-wave generator 1 is connected to the input of the frequency divider 2 and to one input of the exclusive OR gate 4. The output of the frequency divider 2 is connected to the input of the pseudo noise sequence generator 3 and the output of the generator 3 leads to a second input of the exclusive OR gate 4. The signal amplifier 5 follows the exclusive OR gate 4 in the circuit.

Figure 2:
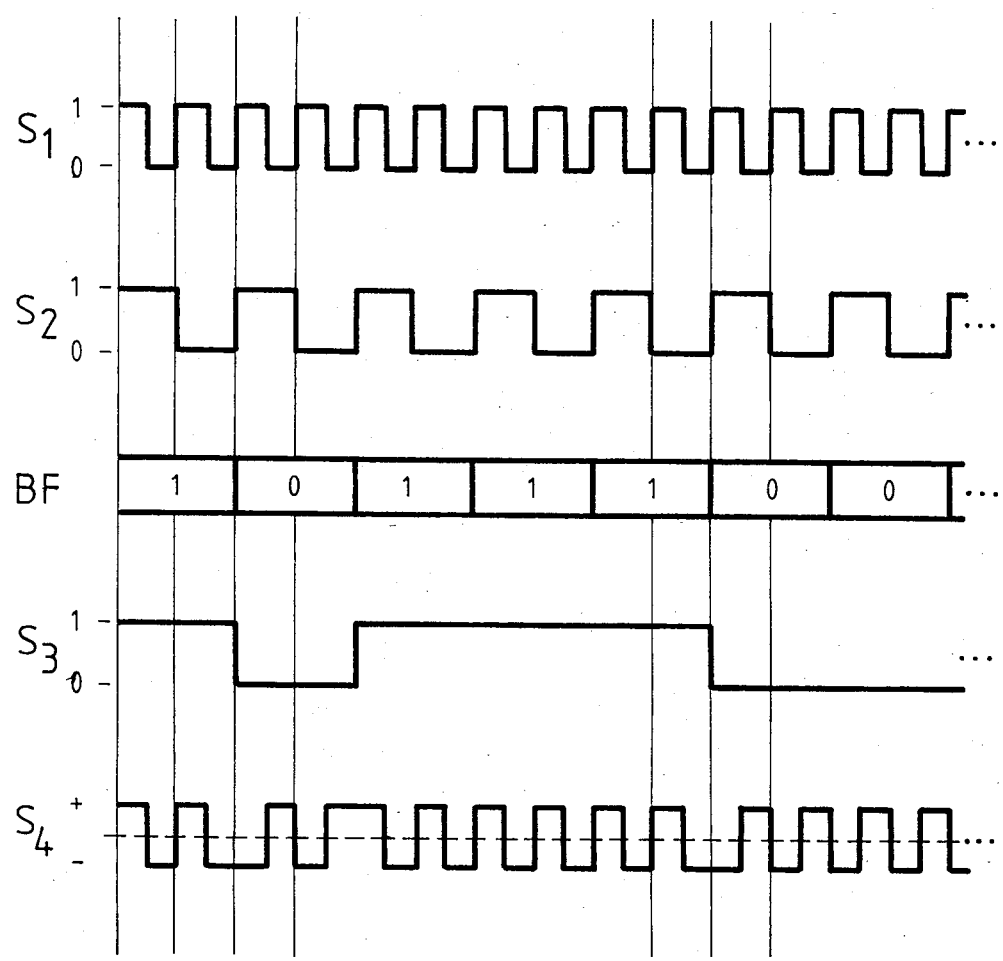
FIG. 2 is a graphical illustration of signal curves presented for the purpose of explaining the mode of operation of the noise transmitter.

The mode of operation of the noise transmitter 6 of FIG. 1 is described with the aid of the signal curves shown in FIG. 2. The square-wave generator 1 produces a selectable square-wave oscillation $S_1$ having a frequency $f_1$, as will be discussed further below.

In the frequency divider 2, following the generator 1 in the circuit, this square-wave oscillation $S_1$ is converted into an oscillation $S_2$. In the embodiment shown, the frequency divider 2 has a divisor $k=2$ and the frequency is therefore divided down at the ratio of 2 to 1.

The oscillation $S_2$ is fed to the pseudo noise generator 3. The pseudo noise generator 3 is also known as a PN (pseudo noise) generator. Such generators have been described in the literature available in the art, such as in the publication by J. MacWilliams and N.J.A. Sloane, entitled "Pseudo-Random Sequences and Arrays", Proceedings of the IEEE 64 (1976) 12, pp. 1715–1729. With the aid of a feedback shift register, the pseudo noise generator 3 generates a certain sequence of binary pulses in synchronism with the oscillation $S_2$, which are periodically repeated after a number N of pulses. This sequence of binary pulses is referred to herein as a pseudostochastic binary sequence BF and a section thereof is shown as an example in FIG. 2. A digital signal $S_3$ which corresponds to the binary sequence BF, appears at the output of the pseudo noise generator 3.

With the aid of the exclusive OR gate 4, the square-wave oscillation $S_1$ is phase modulated by the digital signal $S_3$. The signal appearing at the output of the exclusive OR gate 4 is also fed to a signal amplifier 5 (line driver) and is delivered by the amplifier 5 as a transmitting signal. The transmitting signal is shown in FIG. 2 as a pulse sequence $S_4$. The pulses are symmetrically keyed to the zero line and are periodically free of direct current.

Figure 3:
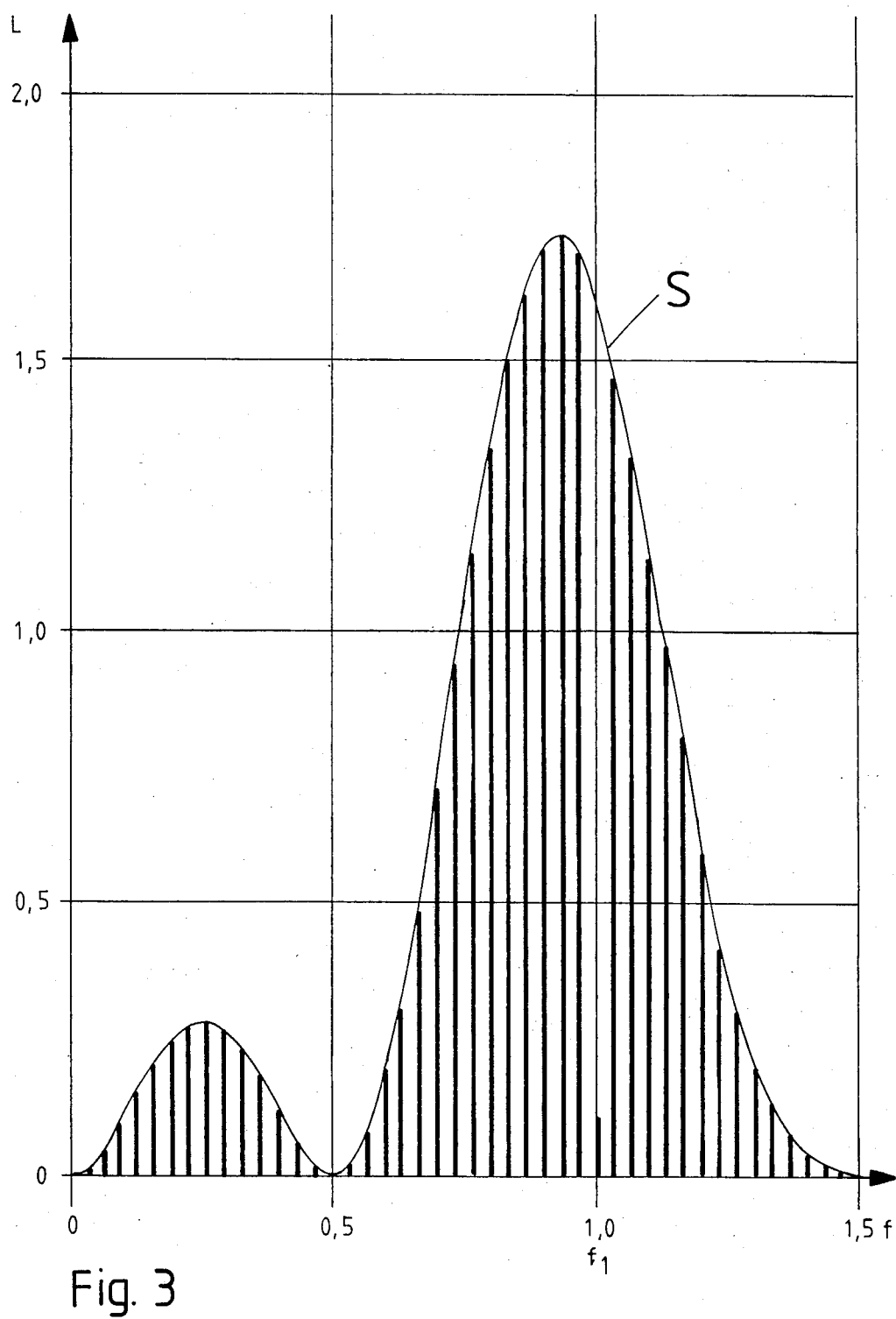
FIG. 3 is a graph of the power spectrum of the pseudo noise signal.

The appropriate selection of the frequency $f_1$, the square-wave oscillation $S_1$, the divisor k, the frequency divider 2 and the number N of pulses per period of the binary sequence BF, is described with the aid of the illustration of the power density spectrum S of the pseudo noise signal in FIG. 3. In FIG. 3, the power density spectrum S for an embodiment with $k=2$ and $N=15$ is shown. In this diagram, a normalized power density L of the individual pulses is plotted against a normalized frequency f. In this normalization, the frequency $f_1$ of the square-wave oscillation $S_1$ (which is the Nyquist frequency) is equal to 1 and the power of the total transmitting pulse is also equal to 1. FIG. 3 shows that the transmitting power is divided into individual spectral lines but is mainly concentrated on spectral lines in the vicinity of the frequency $f_1$. The shape of the spectrum S can be influenced by the choice of the divisor k. The larger the value k, the smaller the band in which the greatest part, for example 80%, of the transmitting power is located. This makes it possible to achieve low losses in filters for band-limiting the signal to be transmitted.

The number of continuously present spectral lines between the two zero points closest to the frequency $f_1$ is $2N-1$. Theoretically, the noise signal would thus be capable of superposition by $(2N-1)$ times. Assuming that the transmission band is limited to the extent that about N spectral lines fall into the pass band and considering the relatively low power of the spectral line at the frequency $f_1$, in practice a continuous spectrum of about N/2 spectral lines can be expected with approximately uniformly high power, that is to say the noise signal can be considered as being capable of superposition by N/2 times. Therefore, the number N of pulses per period of the binary sequence BF will be suitably selected to be approximately twice as high as the number of system users which can be connected to the bus system as a maximum.

FIG. 3 shows that the maximum of the power spectrum does not exactly match the frequency $f_1$ of the square-wave oscillation $S_1$. For this reason, the frequency $f_1$ is selected in such a manner that the maximum of the power spectrum S of the transmitting signal (pulse sequence $S_4$) matches the band-center frequency $f_M$ of a predetermined frequency band having the frequency band width B. The desired concentration of transmitting power on spectral lines in a narrow band is achieved by selecting the divisor k in such a manner that $1/k$ approximately corresponds to the relative band width $B/f_M$.

Figure 4:
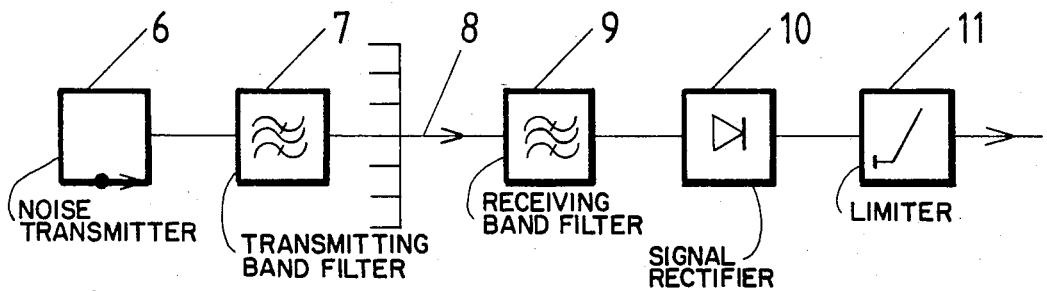
FIG. 4 is a block diagram of the transmission path.

FIG. 4 shows the total transmission path as a series circuit of the noise transmitter 6 shown in FIG. 1, a transmitting band filter 7, a transmission line 8, a receiving band filter 9, a device 10 which rectifies the receiving signal and a limiter circuit 11 which suppresses the signals below a set threshold value. The function of the transmitting band filter 7 and of the signal amplifier 5 shown in FIG. 1 can also be combined in a limiter amplifier. In FIG. 4 only one system user or subscriber is shown having a transmitter which is connected to the transmission line 8 for a bus request. In a data transmission system, however, several system users or subscribers are connected in parallel so that on the transmission line 8, the logical OR operation is performed on the signal for a bus request or collective acknowledgement. In addition, the transmission line 8 can be connected to the data transmitters of the system users or subscribers transmitting in another frequency band.

As an alternative to the digital noise signal described in the illustrated embodiment, a noise signal generated by a different method can also be used. For example, it is known that noise signals can be generated with the aid of diodes operated in the reverse or blocking direction.

For example, these diodes can be a Zener diode or the base-emitter diode of a transistor. Tests have shown that a signal capable of superposition can be generated with such relatively simple noise transmitters, but the spread in the characteristics of the diodes used in the noise transmitters can make the adjustment of a noise signal with the required power level and in a certain frequency band, more difficult. In contrast, a digital noise signal has an advantage which is that the signal can be generated in the desired shape and its capability for superposition can be proved mathematically.

The advantages of the method according to the invention can be summarized as follows:

Band-limiting makes it possible to transmit data and signals for a bus request or collective acknowledgement in frequency-division multiplex on one line. Using noise signals as signals for a bus request or collective acknowledgement makes an individual adjustment of the system user or subscriber equipment unnecessary. As far as digital noise signals are concerned, their capability for superposition for performing the logical OR operation can be mathematically proved and they can be generated in such a form that only small power losses occur if band limiting is applied.

We claim:

1. Method for performing a bus request or collective acknowledgement on a bus system, in a process bus system for serial data transmission, including subscribers of the process bus system, and a bus control device, which comprises generating a band-limited signal capable of superimposition at all of the subscribers in accordance with a common given principle, transmitting the band limited signal by the subscribers for performing a bus request or collective acknowledgement, and analyzing the signal with the bus control device, the method which further comprises forming the signal which is capable of superimposition in the form of an identical digital pseudo noise signal at all of the subscribers, by:

phase modulating a pulse sequence of square-wave oscillations by means of a digital signal formed of a pseuodostochastic binary sequence;

selecting a number of pulses per period of the binary sequence which is substantially twice as high as the maximum number of subscribers connectible to the process bus system; selecting the frequency of the square-wave oscillations in such a manner that the maximum of the power density spectrum of the pulse sequence substantially corresponds to the band center frequency $f_M$ of a predetermined frequency band having a band width B; and selecting a number k of the square-wave oscillations per pulse of the binary sequence in such a manner that 1/k substantially correspond to a relative band width $B/f_M$.

2. Method for performing a bus request or collective acknowledgement on a bus system, in a process bus system for serial data transmission, including subscribers of the process bus system, and a bus control device, which comprises generating a band-limited signal capable of superimposition at all of the subscribers in accordance with a common given principle, transmitting the band-limited signal by the subscribers for performing a bus request or collective acknowledgement, and analyzing the signal with the bus control device; further comprising a diode and filters which comprises forming the signal which is capable of superimposition in the form of a noise signal generated by the diode operated inthe blocking direction and limited by the filters.

3. Method for performing a bus request or collective acknowledgement on a bus system, in a process bus system for serial data transmission, including subscribers of the process bus system, and a bus control device, which comprises generating a band-limited signal capable of superimposition at all of the subscribers in accordance with a common given principle, transmitting the band-limited limited signal by the subscribers for performing a bus request or collective acknowledgement, and analyzing the signal with the bus control device; further comprising a common line; which comprises transmitting data and the signals for a bus request or collective acknowledgement on the common line in separate frequency bands.

4. Method for performing a bus request or collective acknowledgement on a bus system, in a process bus system for serial data transmission, including subscribers of the process bus system, and a bus control device, which comprises generating a band-limited signal capable of superimposition at all of the subscribers in accordance with a common given principle, transmitting the band-limited signal by the subscribers for performing a bus request or collective acknowledgement, and analyzing the signal with the bus control device, the method which further comprises forming the signal which is capable of superimposition in the form of an identical digital pseudo noise signal at all of the subscribers, by phase modulating a pulse sequence of square-wave oscillations by means of a digital signal formed of a pseuostochastic binary sequence;

selecting a number of pulses per period of the binary sequence which is substantially twice as high as the maximum number of subscribers connectible to the process bus system;

selecting the frequency of the square-wave oscillations in such a manner than the maximum of the power density spectrum of the pulse sequence substantially corresponds to the band center frequency $f_M$ of a predetermined frequency band having a band width B; selecting a number k of the square-wave oscillations per pulse of the binary sequence in such a manner that 1/k substantially corresponds to a relative band width $B/f_M$;

including a common line and transmitting data and the signals for the bus request or collective acknowledgement on the common line in separate frequency bands.

5. Method for performing a bus request or collective acknowledgement on a bus system, in a process bus system for serial data transmission, including subscribers of the process bus system, and a bus control device, which comprises generating a band-limited signal capable of superimposition at all of the subscribers in accordance with a common given principle, transmitting the band-limited signal by the subscribers for performing a bus request or collective acknowledgement, and analyzing the signal with the bus control device, including a diode and filters; forming the signal which is capable of superimposition in the form of a noise signal generated by the diode operated in the blocking direction and limited by the filters; including a common line; transmitting data and the signals for a bus request or collective acknowledgement on the common line in separate frequency bands.

6. Device for performing a bus request or collective acknowledgement on a bus system in a process bus system for serial data transmission, comprising a subscribers of the process bus system for transmitting a band-limited digital pseudo noise signal capable of superposition for performing a bus request or collective acknowledgement, a bus control device for analyzing the signal, and a noise transmitter for generating the digital pseudo noise signal at said subscribers, said noise transmitter including a square-wave oscillator having an output, a frequency divider having an input connected to said output of said square-wave oscillator and an output, a pseudo noise sequence generator containing a feedback shift register and having an input connected to said output of said frequency divider and an output, an exclusive OR gate having one input connected to said output of said square-wave generator, another input connected to said output of said pseudo noise sequence generator and an output, and a signal amplifier having an input connected to said output of said exclusive OR gate and an output delivering said digital pseudo noise signal 7. Device according to claim 7, wherein said digital pseudo noise signal produced by said noise transmitter is a pulse sequence formed of square-wave oscillations produced by said square-wave oscillator and phase modulated by a digital signal formed of a pseudostochastic binary sequence generated by said pseudo noise sequence generator, the number of pulses per period of the binary sequence is substantially twice as high as the maximum number of said subscribers connectible to the process bus system, the frequency of said square-wave oscillations is such that the maximum of the power density spectrum of said pulse sequence substantially corresponds to the band center frequency $f_M$ of a predetermined frequency band having a band width B, and the number k of said square-wave oscillations per pulse of said binary sequence is such that $1/k$ substantially corresponds to the relative band width $B/f_M$.

* * * * *